July 10, 1928.
S. QUISLING
1,676,350
ADJUSTABLE PNEUMATIC SPRING
Filed May 2, 1924
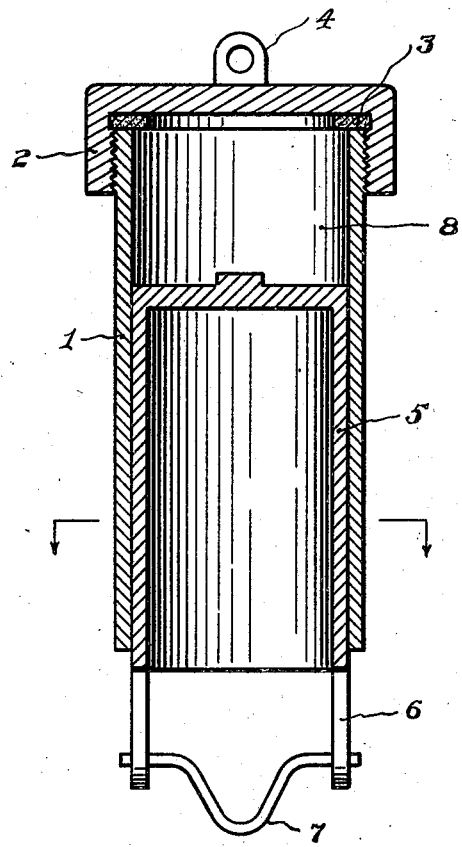
Fig. 1.
Fig. 2.
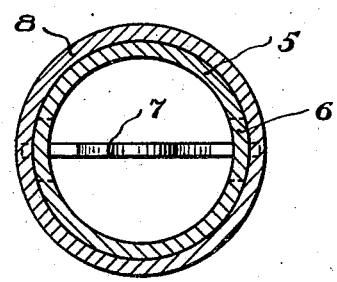
Sverre Quisling
INVENTOR
BY *Victor J. Evans*
ATTORNEY
WITNESS:

Patented July 10, 1928.

1,676,350

UNITED STATES PATENT OFFICE.

SVERRE QUISLING, OF PHILADELPHIA, PENNSYLVANIA.

ADJUSTABLE PNEUMATIC SPRING.

Application filed May 2, 1924. Serial No. 710,653.

This invention comprehends the provision of an instrument or device for yieldable elastic uses, the strength of the elasticity of which is adjustable. The principle of Boyle's law for gases is utilized in the construction of the device, that is, the principle of Boyle's law which includes "The volume of a gas varies inversely as the pressure upon it and for the same density the density of a gas is directly proportional to the pressure acting upon it." Thus, by varying the density of a gas in a closed chamber by a pull applied to a piston regulating the size of a chamber, there will be an opposite force due to atmospheric pressure, the said force acting to bring the density of the gas within the chamber back to its former volume.

More specifically stated the present invention includes a gas chamber with means for admitting desired amounts of gas thereinto and means for variation of the size of said chamber by a second part or parts such as a piston fitting snugly into the first part or chamber, means for attaching the parts thus assembled to any desired object or objects, so that when tension is applied, the elastic counter-force results. The intensity of the elastic tension may be varied by varying the amount of gas in the chamber.

Other objects of the invention will appear in the following detail description, and in the accompanying drawing wherein:

Figure 1 is a vertical section through the improved pneumatic spring.

Figure 2 is a cross section through the spring.

Referring more particularly to the drawings, the improved pneumatic spring structure comprises the cylindrical body 1 which has its lower end open and its upper end closed by a cap 2 which is threaded upon the cylindrical body 1. A gasket 3 is provided which provides fluid-tight connection between part of the body 1 and the cap. The cap 2 may have an eyelet 4 or any other desired construction of attaching member formed thereon to permit its attachment to any suitable object. A piston 5 is mounted for reciprocatory movement within the cylinder 1 and has fluid-tight engagement with the inner wall of the cylinder. Depending diametrically oppositely disposed arms 6 are formed on the lower end of the piston 5 and have a substantially U-shaped attaching rod 7 having its ends bent in opposed relation with respect to each other and connected to the arms 6 adjacent their lower ends to permit attachment to a suitable object so as to provide a spring or cushioning connection between objects connected to the eyelet 4 and the rod 7.

In the operation of the device, the gas within the gas chamber 8 is rarified by descent or outward movement of the piston 5, resulting in lower inside pressure, which will cause a counter-pressure against the piston 5 by atmospheric pressure, thus acting as an elastic force. By unscrewing the cap 2, and varying the amount of gas in the chamber, the density of the gas for the same volume will vary with correspondingly varying pressure and elastic tension.

The improved adjustable pneumatic spring may be utilized for any other purpose in which springs of present constructions are utilized or where it is desired, to elastically support, an object or connection, a plurality of objects.

It is, of course, to be understood, that the invention may be constructed in various other manners and the parts associated in different relations, and therefore, I do not desire to be limited in any manner, except as set forth in the claim hereunto appended.

What I claim is:

A pneumatic spring device comprising a body portion of cylindrical formation, a cap threadedly secured to the top of said body portion, a gasket between the cap and top edge of the body portion to form a fluid-tight connection, a piston movable in said body portion, an eyelet rising from the top of the cap for fastening an object thereto, diametrically oppositely disposed arms depending from the lower end of the cylinder, and a substantially U-shaped rod having its ends bent in opposed relation with respect to each other and secured to the arms adjacent their lower ends.

In testimony whereof I affix my signature.

SVERRE QUISLING.